Figure 1:
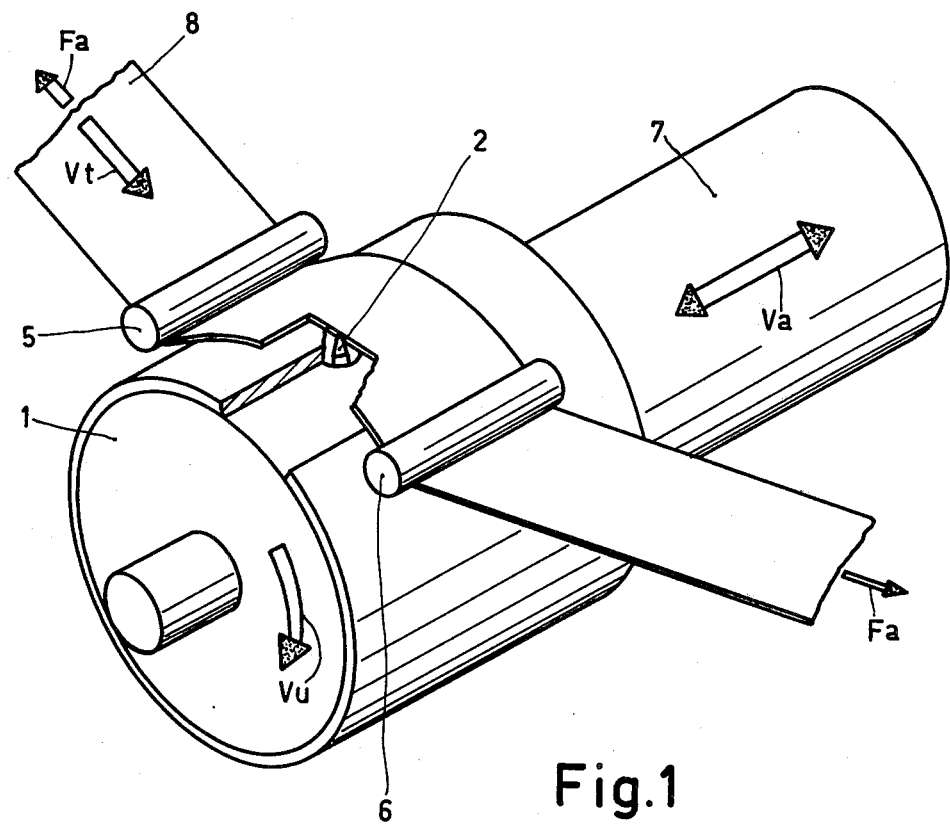

United States Patent [19]
Rothgordt et al.

[11] 4,128,842
[45] Dec. 5, 1978

[54] ELECTROSTATIC PRINTING DEVICE WITH MONOCRYSTALLINE STYLUS

[75] Inventors: Ulf Rothgordt, Norderstedt; HansDieter Hinz, Tornesch, both of Fed. Rep. of Germany; Gerrit Verspui, Eindhoven, Netherlands

[73] Assignee: U.S. Philips Corporation, New York, N.Y.

[21] Appl. No.: 723,053

[22] Filed: Sep. 14, 1976

[30] Foreign Application Priority Data

Sep. 17, 1975 [DE] Fed. Rep. of Germany ....... 2541367

[51] Int. Cl.² .......................................... G03G 15/044
[52] U.S. Cl. ................................. 346/155; 346/139 C
[58] Field of Search ............... 346/153, 155, 156, 165, 346/139 C

[56] References Cited

U.S. PATENT DOCUMENTS

| | | | |
|---|---|---|---|
| 3,774,229 | 11/1973 | Blackwood et al. | 346/155 |
| 3,795,010 | 2/1974 | Ring | 346/155 |
| 4,028,711 | 6/1977 | Jost | 346/153 |

FOREIGN PATENT DOCUMENTS

| | | | |
|---|---|---|---|
| 1120717 | 12/1961 | Fed. Rep. of Germany | 346/139 C |
| 857466 | 12/1960 | United Kingdom | 346/139 C |

OTHER PUBLICATIONS

Van Nostrand's Scientific Encyclopedia, 1974, def. of "Whisker" D. Van Nostrand Co., Princeton, NJ.

*Primary Examiner*—Jay P. Lucas
*Attorney, Agent, or Firm*—Robert S. Smith

[57] ABSTRACT

In order to increase recording quality the electrode pin of a device for electrostatically printing characters consists of a whisker which is mounted to be electrically conductive in a metal holder. A whisker is by definition a monocrystalline member.

8 Claims, 4 Drawing Figures

ELECTROSTATIC PRINTING DEVICE WITH MONOCRYSTALLINE STYLUS

The invention relates to a device for the electrostatic printing of alphanumerical or facsimile characters, comprising means for supplying controllable pulses during the relative movement of an electrode device and a record carrier, the electrodes sliding directly across the surface of the record carrier under pressure.

The recording quality of the method described in U.S. Pat. No. 4,028,711 is mainly dependent of the shape and the material of the recording electrode pins, notably because on the one hand the electrode pins slide across the record carrier under pressure whilst on the other hand, when the micro-recording device is used in the normal information technique, a high recording capacity of up to approximately 30 images of $10^6$ image points per minute must be obtained without error.

Therefore, the tip of the electrode pin must have a high wear resistance for an acceptable period of wear and must be made of a material having a low-fault molecular structure. Moreover, its electrical resistance must be sufficiently low and the area of contact with the record carrier may not be roughened by wear phenomena.

The properties which satisfy these requirements, such as high wear resistance and fineness of structure, are presented by materials such as saphire and diamond in a known and satisfactory manner. However, these materials are not suitable because of their very high specific electrical resistance. Other technically hard materials, such as hard metal and nitrated steels or boron-hardened steels, have suitable electrical properties, but their wear resistance is inadequate on account of a polycrystalline or mixed crystalline structure. Therefore, the wear surface is inadmissibly rough.

All said materials each time have one or a few satisfactory aspects, but for the remainder they are less suitable to a varying extent. Therefore, the combination of all properties does not satisfy the conditions for solving the problem.

The invention has for its object to improve the device in accordance with the noted U.S. patent and to provide a construction of an electrode pin and a material for its manufacture which ensure an adequate service life, the wear not exceeding a permissible margin and conservation of the electrical as well as the mechanical properties and the recording geometry for the recording of faultless, properly shaped and uniformly charged charge images being ensured to an acceptable degree. This is achieved in accordance with the invention in that a whisker is used as the electrode pin, the said whisker being arranged to be in galvanic contact with a metal holder. A whisker of this kind which is known per se (needle-like crystal) offers maximum wear resistance and the best structural properties as a result of its crystalline composition since it is approximately an ideal monocrystal. The term "whisker" as used herein shall be understood to mean a monocrystalline member. This meaning is widely recognized. See for example the McGraw Hill Scientific Dictionary, McGraw Hill Book Company, Highstown, N.J. 08520. Particularly suitable are cylindrical or prismatic whiskers of silicon carbide, which is characterized by its high wear resistance. These whiskers have a constant round or square section of the correct very small dimensions over their entire length. The material has an adequately low specific resistance which can be adjusted to favourable values by doping with suitable elements (for example, nitrogen).

Due to the high wear resistance, the original recording geometry substantially remains unchanged during the service life. Notably, the very smooth contact surface area of the electrode pin with the record carrier is maintained during operation, also in the case of wear (be it that this wear concerns only the smallest material particles), so that on the one hand the recording quality is maintained whilst on the other hand the record carrier is not damaged. On the basis of the low electrical resistance, the application of the charge quantities required for optimum charging is possible within the short pulse durations required for fast recording.

The invention will be described in detail hereinafter with reference to embodiments shown in the figures.

Figure 2:
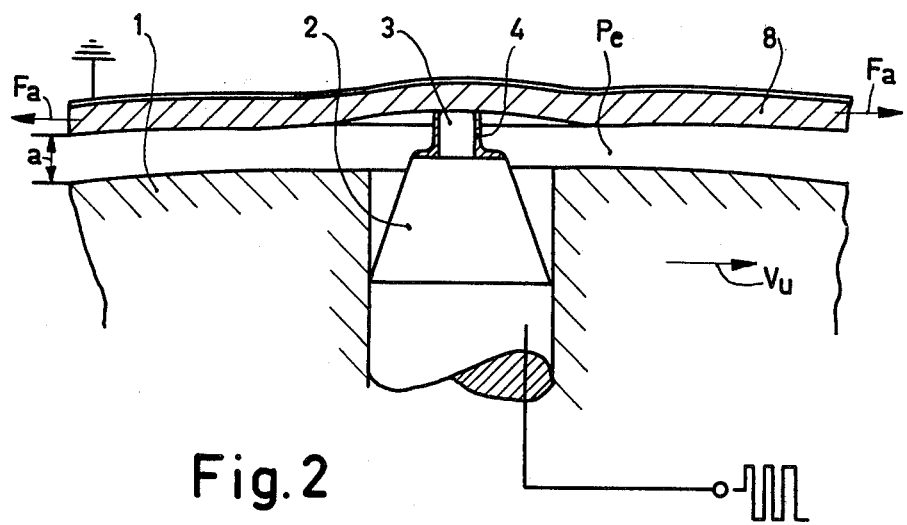
Figure 3:
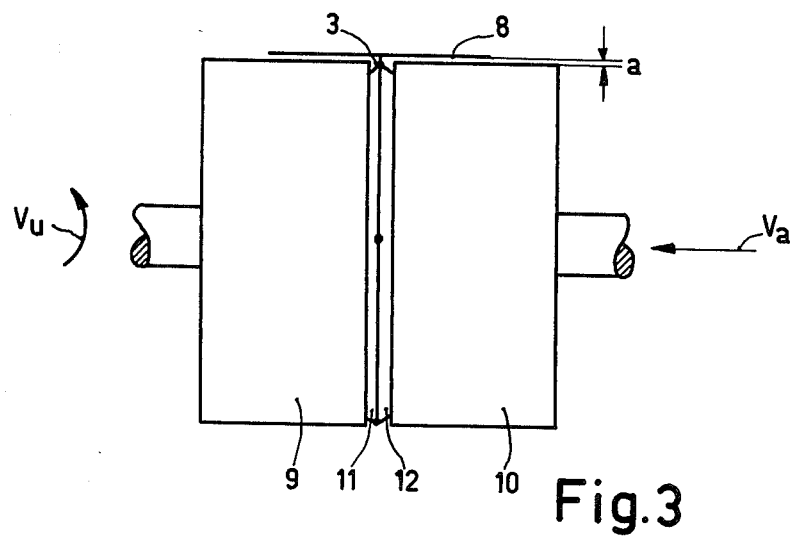
Figure 4:
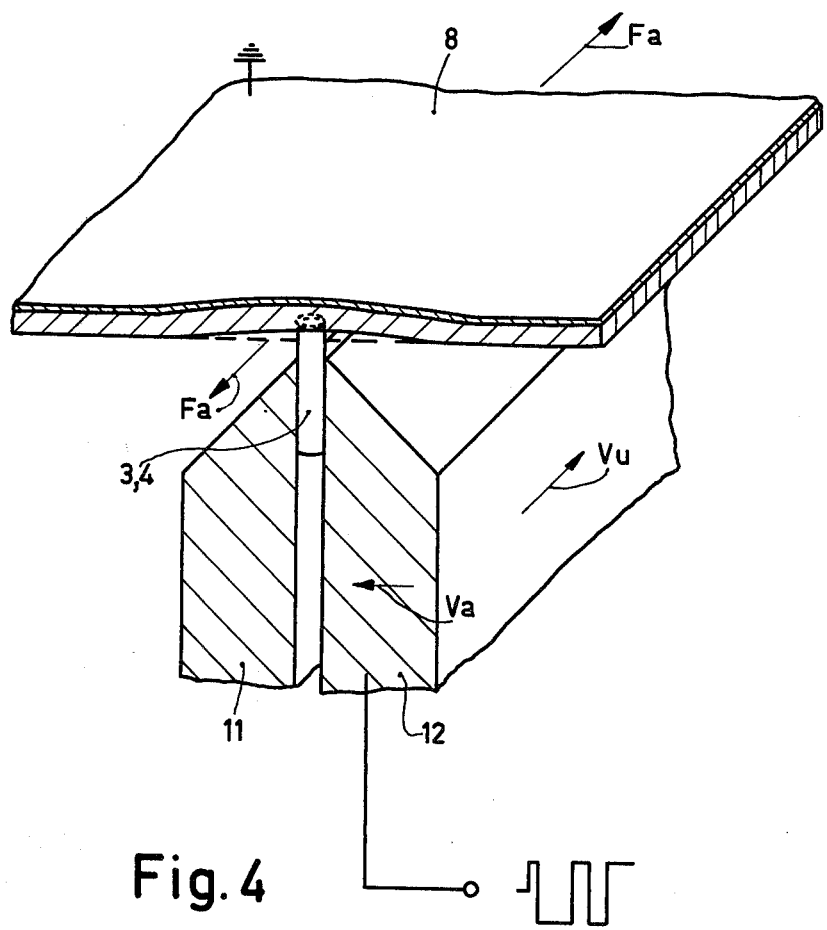

FIG. 1 is a simplified perspective view of a device in accordance with the invention, FIG. 2 is a simplified sectional view at an enlarged scale of the construction of the electrode pin, and also shows the recording geometry shown in FIG. 1, FIG. 3 is a simplied view of a recording roller of a device in accordance with the invention, comprising a multiple electrode pin in accordance with the invention, FIG. 4 is a perspective view at an enlarged scale of a part of the recording roller shown in FIG. 3.

FIG. 1 shows the position of the electrode pin 2 in the recording roller 1 of the microrecording device. For recording, the recording roller 1 rotates at a circumferential velocity Vu, driven by the motor 7. The record carrier, a polyester foil which is transparently metallised on the rear, is guided across a limited sector, the recording area, of the recording roller 1 by the rollers 5 and 6. This record carrier is lifted off the recording roller jacket in a defined manner in the entire recording area by the force F resulting from the aerodynamically produced excess-pressure air film between the rotating recording roller jacket and the recording surface thereof.

For the recording of an image, the rotating recording roller 1, synchronized according to angle of rotation, is moved with its drive motor 7 in the axial direction at the velocity Va. The image plane is linewise scanned in the stationary condition of the foil 8 by the electrode pin tip which contacts the foil under a defined pressure and which is image-wise controlled by electrical pulses (FIG. 2). The foil 8 is advanced one image length at the velocity Vt after the writing of each image.

FIG. 2 shows the recording geometry and the construction of the electrode pin, consisting of the metal holder 2, secured in the recording roller 1, and the whisker 3 which is secured in the holder such that there is galvanic contact between the whisker and the holder, the whisker forming the recording tip of the electrode pin. This electrode pin is preferably made of properly conductive, doped silicon carbide and has a constant round section of a diameter of, for example, 25 microns. This whisker is manufactured according to a generally known pyrolytic process. The tip projects approximately 20 microns from the holder 2 and is, for example, conductively enveloped by a thin, tough metal layer 4. During the manufacture, this jacket 4 faciliates the grinding of the end face which contacts the record carrier 8 and whose edges are thus rounded by approximately 3 microns. The jacket 4, moreover, protects the whisker against damage during operation.

The contacting end face of the recording tip, the whisker 3, projects 10 to 50 microns above the excess-pressure air film, having the thickness $a \approx 50$ microns, and pushes the polyester foil 8 slightly upwards.

The electrostatic microrecording device shown in the FIGS. 3 and 4 deviates from that shown in the FIGS. 1 and 2 only as regards the holder 11, 12 for the whisker 3, the recording tip, which is slightly differently shaped, i.e. as a disk-like holder. The holder 11, 12 is particularly suitable for the use of more than one electrode pin for increasing the recording speed or for decreasing the circumferential speed V$u$ of the recording roller in order to reduce wear. The whiskers 3 of silicon carbide, for example, four whiskers enveloped by a tough material 4, are distributed along the circumference at angular distances of 90°, and are conductively clamped and/or glued between the two retaining disks 11 and 12.

This separately assembled unit 3, 4, 11 and 12 is inserted between the two portions 9 and 10 of the recording roller. The exactly positioned whiskers and the correct aerodynamic distance control of the recording foil 8 provide the same recording geometry for each electrode pin, like in the micro-recording device shown in FIGS. 1 and 2. The electrical control is also identical.

Due to their uncomplicated shape and construction, the recording roller 9, 10 and the retaining disks 11, 12 can be very accurately manufactured, with the result that the whiskers which are substantially uniform as regards shape and dimensions can be very acurately mounted. They are thus positioned exactly in the plane of rotation which is situated at an angle of 90° with respect to the axis of rotation of the recording roller 9, 10.

It is thus ensured that during the recording at the (obviously constant) circumferential velocity (V$u$) and axial recording velocity (V$a$) the centres of the lines which are image-wise charged have the correct and uniform distance from each other. In the case of a point dimension of approximately 15 × 15 microns for the recording of texts in matrix writing, the centres of the points should not deviate more than ± 2 microns from the nominal position in order to maintain a proper text image. This requirement can be more readily satisfied as a result of the positionability of the various electrode pins in accordance with the invention by means of the microrecording device shown in FIGS. 3 and 4.

What is claimed is:

1. A device for the electrostatic printing of characters on an associated record carrier which comprises: an electrode device, means for moving the associated record carrier relative to said electrode, means for supplying controllable pulses to said electrode device during the relative movement of said electrode device and the record carrier, said electrode device sliding directly across the surface of the record carrier under pressure, said electrode device including a whisker mounted to be in galvanic contact with a metal holder, said whisker being a monocrystalline member.

2. A device as claimed in claim 1 wherein said whisker has a cylindrical shape.

3. A device as claimed in claim 1 wherein said whisker has a prismatic shape.

4. A device as claimed in claim 1 wherein said whisker has a constant round cross-section over its entire length.

5. A device as claimed in claim 1 wherein said whisker has a constant square cross-section over its entire length.

6. A device as claimed in claim 1 wherein said whisker is made of silicon carbide.

7. A device as claimed in claim 1 wherein the end face of the whisker which contacts the record carrier is planar and has rounded edges.

8. A device as claimed in claim 1 wherein said whisker is enclosed, except for the free end face by a thin, tough metal layer.

* * * * *